United States Patent [19]
Pittie et al.

[11] 3,920,790
[45] Nov. 18, 1975

[54] SEPARATION AND PURIFICATION OF PLATINUM GROUP METALS AND GOLD

[75] Inventors: Willem Hubert Pittie, Roodepoort; Gerhardus Overbeek, Florida; Kingsley Ferguson Doig, Johannesburg, all of South Africa

[73] Assignee: Swarsab Mining, Exploration & Development Company (Proprietary) Limited, Johannesburg, South Africa

[22] Filed: Aug. 2, 1973

[21] Appl. No.: 384,823

[30] Foreign Application Priority Data

Aug. 10, 1972 South Africa..................5489

[52] U.S. Cl. .................. 423/22; 423/27; 423/34; 423/35; 423/38; 423/95; 75/101 R; 75/121; 75/118

[51] Int. Cl.² ................. C01G 7/00; C01G 55/00

[58] Field of Search.......... 75/101 R, 108, 118, 121; 423/22, 27, 38, 34, 35

[56] References Cited
UNITED STATES PATENTS 2,875,040   2/1959   Barabas ............................. 423/22

OTHER PUBLICATIONS

Bremish, "Talanta," Vol. 5, 1960, pp. 1–35.

*Primary Examiner*—Herbert T. Carter
*Attorney, Agent, or Firm*—Berman, Aisenberg & Platt

[57] ABSTRACT

A method of performing an aqua regia leach on a mixture of PGMs and gold wherein prior to the leach step the PGMs and gold are alloyed with lead by fusing a lead compound, a flux and a reductant for the lead compound if necessary, allowing the melt to solidify, removing the slag formed and dissolving the lead in nitric acid, the alloying procedure tending to render ruthenium and iridium less soluble than they are in their natural states.

16 Claims, 1 Drawing Figure

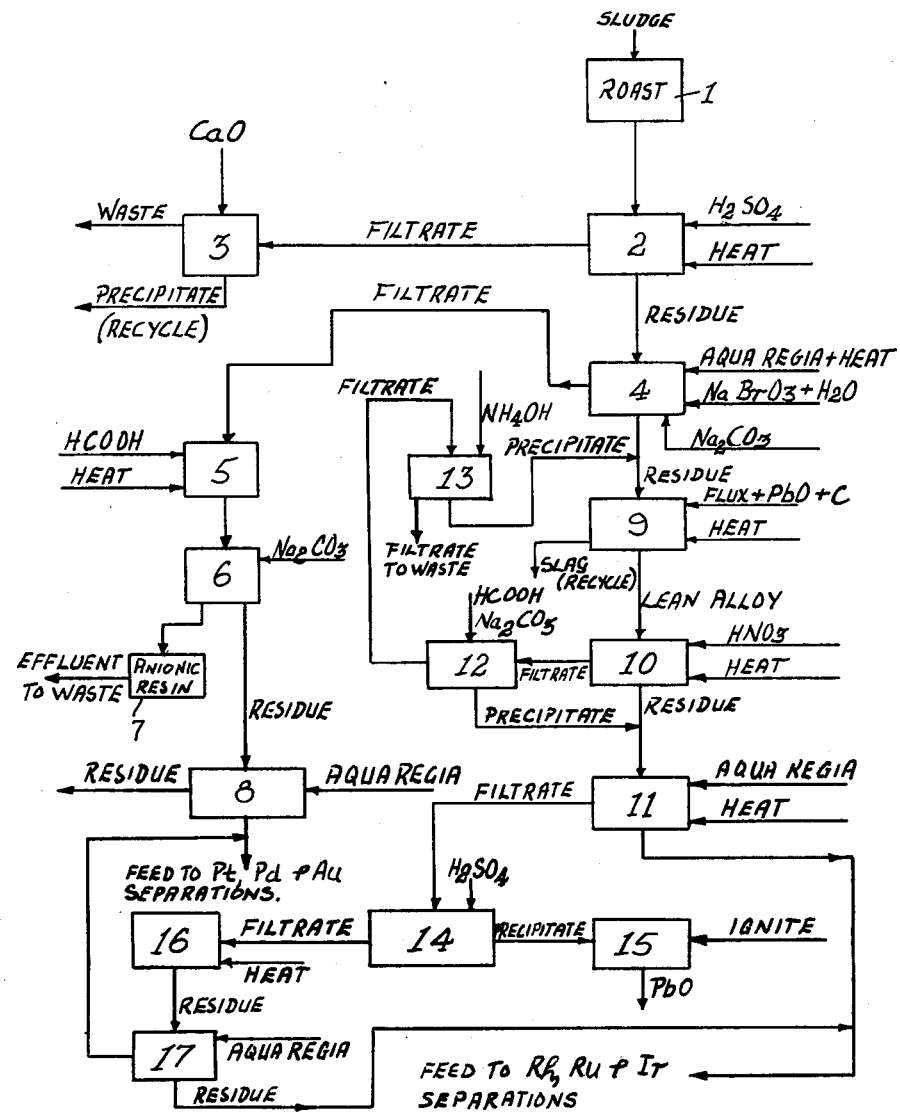

SEPARATING AND PURIFICATION OF PLATINUM GROUP METALS AND GOLD

BACKGROUND

This invention relates to the separation and purification of mixtures of Platinum Group Metals (hereinafter referred to as "PGMs") and gold.

In general, five PGMs, namely, platinum, palladium, iridium, ruthenium and rhodium, occur together in nature with gold and these six elements must be separated from each other and purified in order to be useful in trade or industry. In general, an initial separation of these elements into two groups is effected by treating the basic mixture, which is often a matte leach residue or sludge, with aqua regia, in which case the platinum, palladium and gold dissolve, whilst the iridium, ruthenium and rhodium remain substantially in the residue, resulting from this process. The two groups of metals obtained in this manner are then subjected to generally long and complicated separation procedures in order to separate and purify the individual metals.

The two groups thus obtained often do not have a desirably high degree of split and in particular appreciable amounts of platinum, palladium and gold are often found together with the rhodium, iridium and ruthenium. Also, undesirably large amounts of silica and base metals are generally present in the group consisting of rhodium, iridium and ruthenium.

SUMMARY OF THE INVENTION

It is the object of this invention to provide a process for the purification of PGMs and gold which will provide an improved separation of the two basic groups and also which will assist in removing silica and base metals from the secondary group comprising rhodium, ruthenium and iridium.

In accordance with this invention there is provided a process for the separation and purification of PGMs and gold comprising the steps of fusing the PGMs or a group thereof which includes ruthenium and/or iridium with a lead compound, a reductant where necessary and a flux to form an alloy of PGMs, gold and lead, removing the slag formed and subsequently subjecting the alloy to a nitric acid leach to remove lead and an aqua regia leach to remove platinum, palladium, gold and some rhodium from the ruthenium and/or iridium.

Further features of the invention provide for the above-defined steps to be carried out on the residue obtained from an initial aqua regia leaching step, for the rhodium dissolved in the aqua regia leach after alloying to be rendered aqua regia insoluble by heating to about 575°C to 625°C and to be separated from the platinum, palladium and gold by a further aqua regia leach and for the residue from the latter to be combined with the residue from the first aqua regia leach step effected after alloying to form the feed to a separations process for separating rhodium, ruthenium and iridium.

It has been found that the formation of such an alloy results in silica and base metals being removed to a greater extent than in the conventional process, and also a better defined split between the two groups of metals is obtained. This is partly due to the fact that the alloying procedures render the ruthenium and iridium less soluble than they normally are.

The alloying procedure is preferably effected at a temperature of between 1100°C to 1200°C. The lead compound is preferably lead oxide but could also be, for example, lead carbonate, lead sulphide, lead sulphate or lead acetate. The flux should be a basic flux, such as sodium carbonate, preferably admixed with a melting point depressant, such as borax or fluorspar. The reductant which is necessary in many cases is preferably charcoal. Where lead acetate or lead formate is used as the lead compound, no reductant would be necessary.

DETAILS

In order that the invention may be fully understood, one example thereof as applied to a separations process will now be described with reference to the accompanying flow sheet which is a flow sheet illustrating the basic separations steps embodying the invention.

In general, concentrates of PGMs and gold are obtained in the form of matte leach residues or sludges and the PGMs and gold are processed from this stage in order to separate and purify them.

In this example a matte leach sludge containing PGMs and gold is treated according to the following general procedure which also embodies the results and processes of a specific example wherein the quantities of different reagents actually added are given in parentheses throughout the description.

The sludge used as a starting material in this embodiment contained the following:

| Element | | % | Element | | % |
|---|---|---|---|---|---|
| Platinum | (Pt) | 6.92 | Copper | (Cu) | 6.91 |
| Palladium | (Pd) | 3.04 | Cobalt | (Co) | 0.19 |
| Gold | (Au) | 0.59 | Iron | (Fe) | 4.57 |
| Rhodium | (Rh) | 0.32 | Magnesia | (MgO) | 0.35 |
| Ruthenium | (Ru) | 0.60 | Nickel | (Ni) | 3.50 |
| Iridium | (Ir) | 0.08 | Organic matter | $[Cn(H_2O)_m]$ | 23.1 |
| | | | Potassium | (K) | 0.03 |
| Silver | (Ag) | 0.03 | Silica | $(SiO_2)$ | 12.92 |
| | | | Sodium (Na) | | 9.25 |
| Alumina | $(Al_2O_3)$ | 3.60 | Sulphur (Total) | (S) | 19.63 |
| Antimony | (Sb) | 0.05 | Tellurium | (Te) | 0.29 |
| Bismuth | (Bi) | 0.11 | Zinc | (Zn) | <0.001 |
| Calcium Oxide | (CaO) | 0.49 | Other + $O_2$ + $H_2O$ | (By diff) | 3.43 |
| | | | | | 100.00 |

Firstly 2.5 kg of the sludge was roasted in a stream of air at 600°C for two hours in order to convert any sulphides and free sulphur to oxides at stage 1.

The roasted material was boiled at stage 2 for two hours with 20% $H_2SO_4$ (3 l) under reflux with stirring, cooled to ±55°C and filtered to dissolve the bulk of the base metals present.

To the filtrate calcium oxide (CaO) was added at stage 3 to precipitate all the nickel, copper, PGMs and gold in the filtrate. This precipitate was kept and contained 30 mg platinum, 100 mg palladium, 10 mg gold, 50 mg rhodium and 40 mg iridium. In practice this precipitate would be recycled to a matte smelter.

The residue obtained after the sulphuric acid treatment was then leached at stage 4 with aqua regia (1½ l) for three hours. This aqua regia leach and all subsequent aqua regia leachings were carried out as follows:

The material was boiled with the required amount of hydrochloric acid (HCl) under reflux for thirty minutes. The required quantity of nitric acid ($HNO_3$) was then added slowly over a period of sixty minutes. The mixture was then allowed to boil for the remaining length of time (i.e. one and a half hours).

Sodium bromate ($NaBrO_3$) (30g) was then added to the solution which was allowed to boil for a further thirty minutes after diluting the solution with water (1.5 - 3 l) to oxidise the PGMs and gold to their highest stable oxidation states. The pH was then adjusted to 6.5 with sodium carbonate (± 60°C) (1 kg) to precipitate all the metals except platinum as their hydrated oxides. The solution was allowed to stand for twenty minutes and then filtered under vacuum. The platinum was removed in this manner in order to decrease the bulk of the PGMs and gold to be subjected to lead alloying by about 50%.

To the filtrate [+90% of platinum (Pt) in the feed] formic acid (0.2 l) was added at stage 5 and the solution boiled under reflux with stirring for five hours. Sodium carbonate ($Na_2CO_3$) (0.3 kg) was added at stage 6 stage-wise over a period of one hour until a pH 5.0 was obtained. The solution was then boiled for a further sixty minutes, cooled to 60°C and filtered under vacuum. These steps 5 and 6 were performed in order to precipitate platinum from the solution.

The filtrate was passed over an anionic exchange column at stage 7 and the effluent discarded. This effluent contained 100 mg Pt, 10 mg Pd, 10 mg Au, 1 mg Rh and 25 mg Ir.

The precipitate was dissolved at stage 8 in aqua regia (1.0 l), cooled and filtered. The residue obtained was silver chloride (AgCl).

This aqua regia filtrate contained the bulk of the platinum. This platinum was combined with the bulk of the palladium and gold as described hereinafter and separation of these PGMs effected by a separate procedure. This procedure will not be described herein, since it is irrelevant to the basic separation steps provided by this invention.

The residue/precipitate obtained from the initial aqua regia leach and sodium carbonate precipitation at stage 4 (±1400 g) was mixed with a Flux A and a Flux B defined below and fused at stage 9 for seventy-five minutes at 1140°C. The result of this is that the rhodium is for the most part converted from an aqua regia insoluble form to an aqua regia soluble form. Also the solubility in aqua regia of the iridium and ruthenium is further decreased. 2.5 kg of Flux A per kg of residue and 335 g of Flux B per 100 g of PGM + Au to be collected were used. These fluxes had the following compositions:

FLUX A (active flux) (3.5 kg)
(1) Borax $Na_2B_4O_7$ : 20% (0.75 kg)
(2) Sodium carbonate $Na_2CO_3$ : 80% (2.75 kg)

FLUX B (Collector) (0.55 kg)
(1) Litharge PbO : 90% (0.5 kg)
(2) Charcoal C : 10% (0.05 kg)

The molten material was poured into iron moulds where it was allowed to cool. The lead buttons thus obtained were separated from the slag and the slag was crushed and kept but in practice would be returned to the matte smelter. The slag contained 520 mg Pt, 230 mg Pd, 45 mg Au, 24 mg Rh, 45 mg Ru (ruthenium) and 5 mg Ir.

The lead buttons were crushed and then boiled at stage 10 for five hours under reflux with 20% $HNO_3$ (5.5 l) in order to remove lead. The solution was cooled to 55°C and filtered under vacuum. The residue was fed to a subsequent aqua regia leach step indicated at stage 11.

Formic acid (0.05 l) was added at stage 12 to the filtrate from the nitric acid leach of stage 10 and the pH adjusted to 2.0 with sodium carbonate $Na_2CO_3$ (0.3 kg) to precipitate any PGMs and gold dissolved by the nitric acid. The solution was then stirred for five hours at room temperature and filtered under vacuum.

The precipitate obtained was combined with the residue obtained from the nitric acid leach step at stage 10 and fed to the aqua regia leach step at stage 11. $NH_4OH$ was added at stage 13 to the filtrate to precipitate the lead and any PGM + Au present and this precipitate was dried - ignited and in practice would be returned to the lead fusion step at stage 9.

The combined residue/precipitate was boiled at stage 11 with aqua regia (0.75 l) for three hours under reflux. The solution was cooled to 55°C and filtered under vacuum. The residue formed part of the feed to the process for separating rhodium, iridium and ruthenium from each other. This residue contained 850 mg Pt, 700 mg Pd, 100 mg Au, 5000 mg Rh, 14720 mg Ru and 1420 mg Ir. The precious metals usually make up approximately 50% of this by metal concentrate, the remaining 50% being lead chloride ($PbCl_2$).

To the filtrate from the aqua regia leach step at stage 11 the stoichiometric amount of $H_2SO_4$ plus a 10% excess (100 ml of 50% $H_2SO_4$) was added at stage 14 to precipitate lead present in this solution. The solution was boiled for thirty minutes, cooled to 55°C and filtered.

The precipitated lead sulphate was ignited at stage 15 to litharge (PbO) and was ready to be recycled to the lead fusion step.

The filtrate from the lead precipitation step was evaporated to dryness at stage 16 and the salts thus obtained ignited at 600°C for two hours. This temperature was found to be important in rendering rhodium in the residue aqua regia insoluble.

The ignition product was then boiled at stage 17 with aqua regia (0.75 l) under reflux for three hours. The solution was cooled and filtered under vacuum.

The residue was combined with the residue from the aqua regia leach step of stage 11 effected after alloying to give a combined feed for the separation of the secondary PGMs, namely, rhodium, ruthenium and iridium having a PGM and gold content of 1130 mg Pt, 850 mg Pd, 120 mg Au, 7480 mg Rh, 14920 mg Ru and 1720 mg Ir.

The filtrate obtained from the final aqua regia leach step of stage 17 was combined with that obtained in the aqua regia leach step of stage 8 performed on the metals dissolved in the initial leach step 4 to provide a feed for the separations process of platinum, palladium and gold. This feed had a PGM and gold content of 171210 mg Pt, 74790 mg Pd, 14560 mg Au, 200 mg Rh, 25 mg Ru and 210 mg Ir.

It will therefore be appreciated that use of the present invention enables the two groups of PGMs and gold to be effectively separated from each other and from base metals and gangue contained in the original feed.

What we claim as new and desire to secure by Letters Patent is:

1. A process for separating and purifying a mixture of PGMs and gold, which includes at least one of the PGMs, rhodium, ruthenium and iridium, comprising:
    A. fusing the mixture of PGMs with a lead compound and a flux,
    B. casting the fused mixture into an alloy of PGMs, gold and lead,
    C. removing slag formed while preparing the alloy,
    D. subjecting the alloy
        1. to a nitric acid leach to remove lead therefrom and subjecting the resulting residue thereof
        2. to an aqua regia leach to obtain
            a. a leach solution containing any platinum and palladium present in the mixture, gold and some rhodium, when the latter is present in said mixture, and
            b. a residue containing the PGMs ruthenium and iridium present and some rhodium, when the latter is present in said mixture,
    E. evaporating the aqua regia leach solution to dryness to obtain a residue,
    F. igniting the residue at a temperature of from about 575° to 625° C, and
    G. leaching thus-ignited residue with aqua regia to remove from the residue any gold, platinum and palladium therein and to leave in said thus-leached residue initially-contained rhodium, iridium and ruthenium in an aqua-regia-insoluble form.

2. A process as claimed in claim 1 in which the lead compound comprises at least one or more member selected from the group consisting of lead oxide, lead carbonate, lead sulphide, lead sulphate, lead acetate and lead formate.

3. A process as claimed in claim 1 in which the lead compound is lead oxide.

4. A process as claimed in claim 1 in which the fusing is carried out at between 1100°C and 1200°C.

5. A process as claimed in claim 1 in which the flux is sodium carbonate.

6. A process as claimed in claim 1 in which a melting point depressant is used in conjunction with the flux.

7. A process as claimed in claim 6 in which the melting point depressant is borax and fluorspar.

8. A process according to claim 1 wherein the mixture is residue from an aqua regia leaching of a combination of components comprising PGMs and gold.

9. A process according to claim 8 which comprises:
    A. aqua-regia-leaching of the combination of components comprising PGMs and gold to obtain an aqua regia leach solution and residue,
    B. precipitating gold and PGMs other than platinum from the aqua regia leach solution with sodium bromate and sodium carbonate, and
    C. combining thus-precipitated gold and PGMs other than platinum with the residue from (A).

10. A process according to claim 1 wherein the nitric acid leach of the alloy results in a nitric acid leach solution and a residue and which comprises:
    a. precipitating any PGMs dissolved in the nitric acid leach solution and
    b. adding thus-precipitated PGMs to the residue from the nitric acid leach of the alloy prior to leaching said residue with aqua regia.

11. A process according to claim 10 wherein the nitric acid leach solution is adjusted to a pH of about 2.0 and the precipitating is effected with formic acid.

12. A process according to claim 1 which comprises precipitating lead from the leach solution obtained from the aqua regia leach of the alloy residue.

13. A process according to claim 12 wherein the precipitating is effected with sulphuric acid.

14. A process according to claim 1 wherein (A) comprises fusing the mixture of PGMs with a lead compound, a reductant and a flux.

15. A process according to claim 14 wherein the reductant is carbon.

16. A process according to claim 15 wherein the carbon reductant is in charcoal form.

* * * * *